Aug. 8, 1950    G. C. COLEMAN    2,517,631
TIRE AND WHEEL PULLER AND REPLACER
Filed July 27, 1948    2 Sheets-Sheet 2
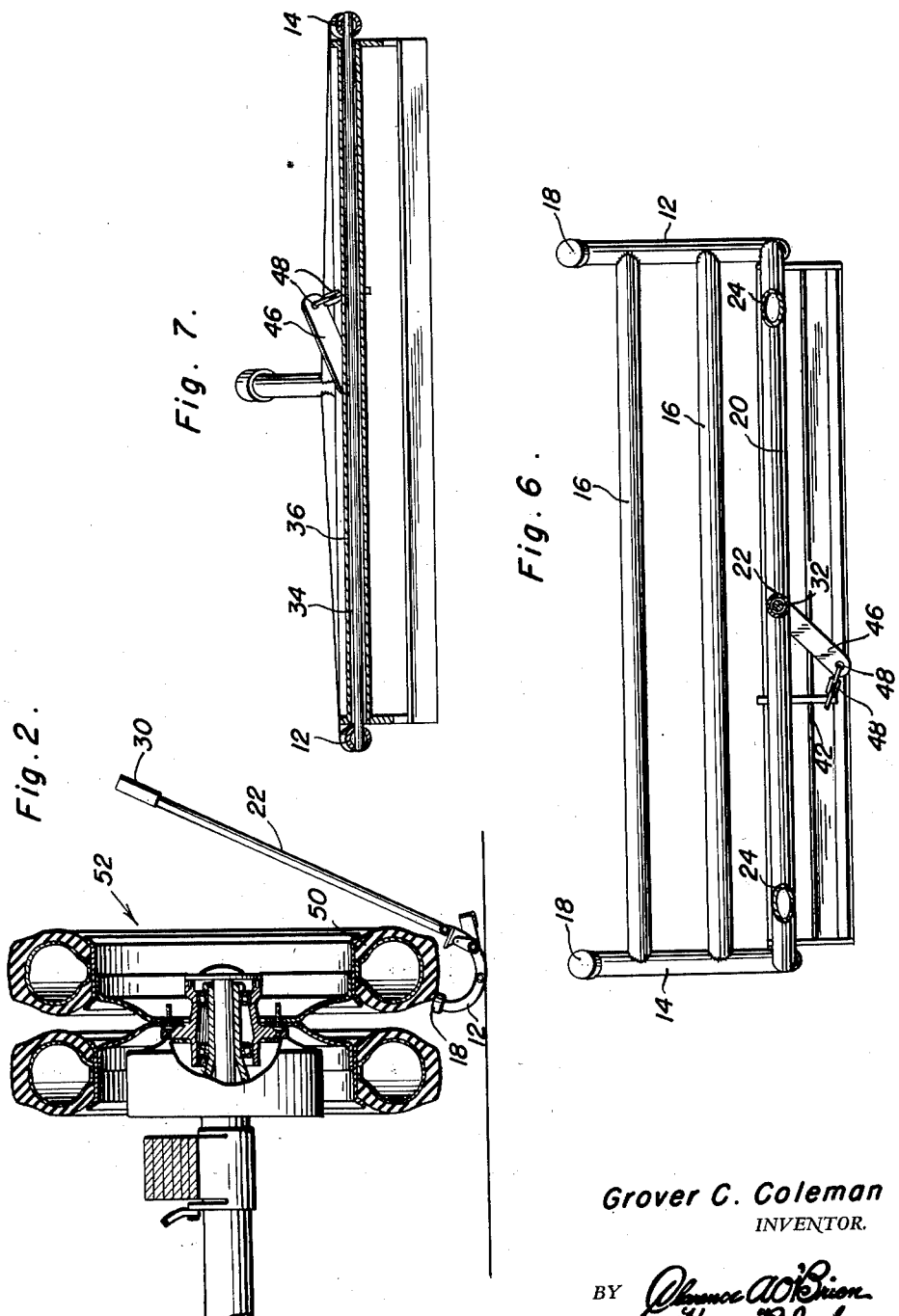
Grover C. Coleman
INVENTOR.

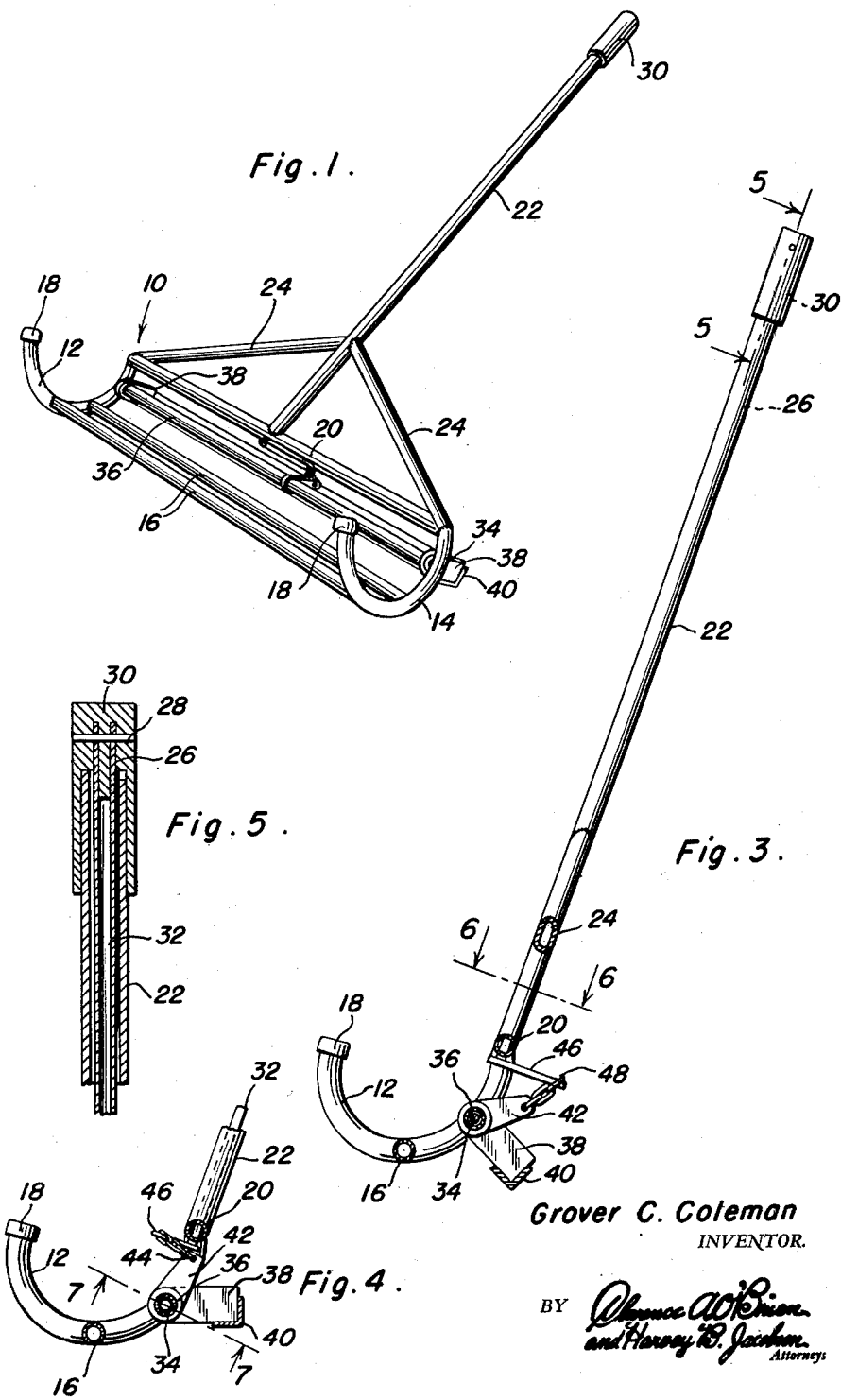

Patented Aug. 8, 1950

2,517,631

UNITED STATES PATENT OFFICE 2,517,631

TIRE AND WHEEL PULLER AND REPLACER

Grover C. Coleman, Detroit, Mich.

Application July 27, 1948, Serial No. 40,825

5 Claims. (Cl. 254—131)

This invention relates to an improved hand tool adapted for use in changing tire equipped wheels, such as used on automobiles, heavy trucks, trailers, etc.

The primary object of this invention is to provide a tire and wheel puller and replacer which can be easily handled and manipulated when mounting and dismounting tires, all in a manner to obviate the necessity for the operator to directly lift the tire onto or from a wheel of the vehicle, whereby to greatly facilitate the tire changing operation by relieving the operator of the most laborious part thereof.

Yet another object of this invention is to provide a tire and wheel removing device including a means pivoted on the device for raising and lowering the latter when needed.

Yet another object of this invention is to provide a tire remover and replacer consisting of an arcuated elongated frame carrying a lever arm for rocking the latter, tire gripping members carried by the frame, a handle rotatable on the lever arm, and means actuated by the rotatable handle for raising or lowering the frame when desired. In a raised position, the device is employed for replacing the tire upon the hub, and in a lowered position, the device is employed for removing the tire from the hub.

These, together with various ancillary objects and features of the invention which will later become apparent as the following description proceeds, are attained by the device, a preferred embodiment of which has been illustrated by way of example only in the accompanying drawings, wherein:

Figure 1 is a perspective view of the device of the instant invention;

Figure 2 is a side elevational view of the device, some parts shown in section, as applied to a wheel for removing a tire;

Figure 3 is a longitudinal vertical sectional view through the arcuate frame of the device shown in Figure 1, showing the raising and lowering means in a lowered position;

Figure 4 is a fragmentary sectional view similar to that shown in Figure 3 illustrating the raising and lowering means in a lowered position;

Figure 5 is a sectional view taken substantially in a plane of section line 5—5 of Figure 3;

Figure 6 is a sectional view taken substantially in a plane of section line 6—6 of Figure 3; and Figure 7 is a sectional view taken substantially in a plane of section line 7—7 of Figure 4.

Specific reference is now made to the drawings. In the several views in the accompanying drawings and in the following specification reference characters indicate corresponding elements throughout.

The device of the instant invention consists of an arcuated frame 10 which is constructed in the following manner. A pair of arcuate side members 12 and 14 are provided, preferably semi-circular, which are interconnected by means of a plurality of rods 16. The free ends of the side members 12 and 14 each carry a tire gripping member 18. The rear rod 20 interconnecting the side members is provided with an aperture intermediate the ends thereof into which extends a hollow lever arm 22 which is additionally secured to the frame member 10 by means of rearwardly diverging brace member 24.

Extending through the lever arm 22 is a tubular member 26 of substantially rectangular cross section which is apertured at the upper end thereof to receive a retaining pin 28 for securing a handle portion 30 thereto which, as clearly shown in Figure 5, is a sleeve rotatable on the lever arm 22. Positioned within the tubular member 26 is a squared shaft 32 which also extends through the entire length of the lever arm 22. Thus the shaft 32 is rotatable with the handle portion 30.

Interconnecting the side members 12 and 14 of the frame adjacent the rear rod 20 and parallel thereto is another rod 34 about which is rotatably positioned a hollow rod 36.

Rigidly secured to and rotatable with the hollow rod 36 is a pair of lugs 38 which are rigidly secured at the free ends thereof to a transversely extending angle 40.

Secured to the hollow rod 36 is a further lug 42 which is apertured at its free end as at 44.

The square shaft 32 has its free extremities extending through the aperture in the rear rod 20 and has secured thereto a link 46 which is apertured at the free end thereof as at 48. Interconnecting the link 46 with the lug 42 is a small length of a link chain 48.

In practical operation, the handle 30 is rotated in such a manner that the angle 40 is raised to the position shown in Figure 4 whereupon the frame 10 is placed on the ground with the tire gripping members 18 contacting the inside of the first tire 50 of a truck wheel 52. By urging the lever arm 22 downwardly, the frame 10 will be rocked providing leverage to pull the tire off the hub of the wheel. Of course, it will be understood that such a rocking action will have to be repeated a number of times. In the mounting of a tire or wheel on a hub, the handle portion 30 is rotated so that the angle 40 is lowered to assume the position shown in Figure 3 whereupon the frame 10, in effect, rests upon the angle 40. The tire gripping members 18 will be positioned on the outside of the outer tire and by tilting the device forwardly, the assembly can be pushed onto the hub again.

It is to be understood, of course, that this tool is capable of pulling tires and rims as well as pulling both tires and hub assemblies for the subsequent examination and greasing of bearings when necessary.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed as new is:

1. A tire and wheel puller and replacer comprising an arcuate frame having spaced arcuate side members and rods interconnecting said side members, one of which rods is rotatable on said side members, tire gripping members carried on the free ends of said side members, an elongated hollow lever arm secured to said frame, a handle rotatable on said lever arm, and means connected to said rotatable rod and actuated by said handle for raising and lowering said frame, said means including an angle, means for securing said angle to said rotatable rod and link means interconnecting said angle with said rotatable handle.

2. The combination of claim 1 wherein said last-mentioned means includes a shaft extending through said lever arm, means for securing said handle to said shaft, an arm secured to the lower extremity of said shaft, a lug fixed to said rotatable rod, and a chain interconnecting the free end of said lug with the free end of said arm.

3. The combination of claim 2 wherein said lever arm is secured to one of said rods intermediate the ends thereof.

4. The combination of claim 3 wherein the lower extremity of said shaft extends through an aperture provided in one of said rods.

5. A tire and wheel puller and replacer comprising an arcuate frame including a rod rotatably mounted thereon, said rod including a ground-engaging fulcrum bar, tire gripping members carried by said frame, an elongated hollow lever arm secured to said frame, a handle rotatably mounted on said lever arm, and means connecting said handle to said rotatable rod for raising and lowering said fulcrum bar.

GROVER C. COLEMAN.

REFERENCES CITED

The following references are of record in the file of this patent:

UNITED STATES PATENTS

| Number | Name | Date |
|---|---|---|
| 1,920,350 | Bourdon | Aug. 1, 1933 |

FOREIGN PATENTS

| Number | Country | Date |
|---|---|---|
| 20,250 | The Netherlands | Feb. 15, 1929 |
| 320,796 | Great Britain | Oct. 24, 1929 |